United States Patent Office 3,538,133
Patented Nov. 3, 1970

---

3,538,133
MOLECULAR COMPLEXES OF RUTHENIUM WITH HYDROGEN AND NITROGEN
Walter H. Knoth, Jr., Mendenhall, Pa., assignor to E. I. du Pont de Nemours and Company, Wilmington, Del., a corporation of Delaware
No Drawing. Filed Sept. 25, 1968, Ser. No. 762,640
Int. Cl. C07j *15/00*; C07c *121/30*
U.S. Cl. 260—429                    9 Claims

---

ABSTRACT OF THE DISCLOSURE

Tris(triarylphosphine)ruthenium halohydride or dihalide complexes in which the aryl group is free of ortho-substituents can be reacted with an alkali metal borohydride to give complexes of the formula $[Ar_3P]_3RuH_4$. The hydride reacts reversibly with nitrogen to give compounds having the formula $[Ar_3P]_3Ru(H_2)(N_2)$ which are useful as catalysts for the dimerization of acrylonitrile. The ruthenium nitrogen complex can also be made by reduction with an aluminum trialkyl and reaction of the intermediate with nitrogen.

---

FIELD OF THE INVENTION

This invention relates to novel complexes of ruthenium which contain hydrogen and nitrogen and to methods of preparing the same.

SUMMARY OF THE INVENTION

The compounds of the present invention are defined by the formula:

$$[RC_6H_4)_3P]_3Ru(Q_2)H_2$$

wherein R is hydrogen or an alkyl substituent of 1 to 3 carbon atoms in the meta or para position of the phenyl ring, and in which Q is H or N.

The above compounds wherein Q is nitrogen, that is $[(RC_6H_4)_3P]_3Ru(N_2)H_2$, can be made by reduction of the corresponding dihalide or nitrogen halide complexes $$[RC_6H_4)_3P]_3RuHX$$

or $$[RC_6H_4)_3P]_3RuX_2$$

in which X is a halogen of atomic number 17–53 inclusive, with an alkali metal borohydride or a trialkyl aluminum compound in which the alkyl radicals preferably contain from 1 to 10 carbon atoms, and reacting the intermediate products with nitrogen.

The above processes can be conducted in an inert atmosphere such as argon and the intermediates obtained reacted with nitrogen. In the alternative, the reaction can be conducted in nitrogen to produce the nitrogen containing ruthenium complex directly.

When an alkali metal borohydride is used as the reducing agent the intermediate obtained is hydride having the formula $[(RC_6H_4)_3P]_3RuH_4$. This complex ruthenium hydride can also be prepared by the action of hydrogen on the nitrogen containing ruthenium complex.

DETAILED DESCRIPTION OF THE INVENTION

The compounds of the present invention can be represented by the formula:

$$(RC_6H_4P)_3Ru(Q_2)H_2$$

wherein $C_6H_4$ is a phenylene radical and R is hydrogen, or a meta or para alkyl substituent of 1 to 3 carbon atoms, i.e., methyl, ethyl, propyl, or isopropyl, and in which Q is H or N. The compounds of the present invention can be made by reduction of either $L_3RuHX$ or $L_3RuX_2$ in which L is a complexing ligand $(RC_6H_4)_3P$ and X is a halogen atom of atomic number 17–53 with an alkali metal borohydride $MBH_4$, in an inert atmosphere such as argon to give the corresponding hydride, followed by (reversible) reaction with nitrogen.

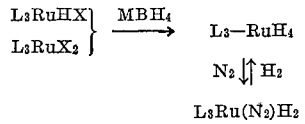

Alternatively, the reduction step and the reaction with nitrogen can be conducted simultaneously by reducing the halogen compounds $L_3RuHX$ or $L_3RuX_2$ in a nitrogen atmosphere.

The nitrogen containing complexes of the present invention can also be made by reducing the halogen compounds $L_3RuX_2$ or $L_3RuHX$ with an aluminum trialkyl in which the alkyl groups preferably contain from 1 to 10 carbon atoms in the presence of or followed by treatment with nitrogen.

Solvents which are inert to the reactants and the products can be employed. In the case of the case of aluminum trialkyl reducing agents, inert aprotic solvents of high dielectric constant should be used, preferably ethers such as dimethyl ether, diethyl ether, tetrahydrofuran, dioxane, trioxane or the di(loweralkyl)ethers of ethylene glycol or polyethylene glycols. The above solvents can also be employed for the alkali metal borohydride reducing agents and in addition alcohols such as methanol, ethanol or other lower aliphatic alcohols.

The temperature at which the reaction is conducted is not critical. Ambient temperature is suitable and is preferred. Suitably the reaction can be conducted from $-30°$ C. to $70°$ C.

The reactions start immediately and are generally complete in less than three hours for the trialkylaluminum reagents and in three to five hours for the borohydride reagents.

Pressure is likewise not critical and can vary from about atmospheric pressure or lower to high pressures.

As will be described hereinafter, the products of this invention react with oxygen, and accordingly the reaction should be conducted under substantially oxygen-free conditions.

UTILITY

The compounds of the present invention absorb oxygen to form highly colored products and are thus useful for the detection of oxygen.

The compounds are also useful catalysts for the dimerization of acrylonitrile to 1,4-dicyano-1-butene. The latter compound can be reduced by techniques known in the art to hexamethylenediamine, a valuable chemical employed in the manufacture of polyamide resins.

This invention is further illustrated by the following examples which should not, however, be construed as fully delineating the scope of this discovery.

Example 1

Part A.—Preparation of $[(C_6H_5)_3P]_3RuHCl \cdot C_6H_5CH_3$: Ruthenium trichloride hydrate (37% ruthenium, 8.0 g.) was extracted with methanol (600 ml.). Triphenylphosphine (48.0 g.) was added to the extract and the mixture was refluxed overnight in a nitrogen atmosphere. It was then filtered in a nitrogen atmosphere, the filter cake was rinsed with methanol and dried under vacuum at ambient temperature to obtain a dark brown solid (28.0 g.). Twelve grams of this solid was mixed with toluene (175 ml.), triphenylphosphine (3.6 g.), and triethylamine (3.0 g.) and stirred under hydrogen pressure (40 p.s.i.g.) at ambient temperature for two days. The mixture was filtered in a nitrogen atmosphere. The solid filter cake was washed with ethanol (300 ml.) and then with toluene (50 ml.).

The residue was dried under vacuum at ambient temperature to obtain a toluene solvate of the tris(triphenylphosphine)ruthenium chlorohydride (9.4 g.) which was of sufficient purity for use in the Examples of this invention.

Part B.—Preparation of $[(C_6H_5)_3P]_3Ru(N_2)H_2$ and $[(C_6H_5)_3P]_3RuH_4$: A 300 ml. round-bottomed flask was dried by heating with a flame while nitrogen was passed through the flask. The flask was fitted with a solid carbon dioxide-acetone cooled condenser, a serum stopper and a gas inlet tube. Ether (40 ml.) and the toluene solvate of tris(triphenylphosphine)ruthenium chlorohydride (1.0 g.) prepared as in Part A were added to the flask. The gas inlet tube was adjusted so that its lower end was just above the surface of the reaction mixture while it was stirred. A stream of nitrogen was run continuously through this tube. The contents of the flask were stirred throughout the reaction using a magnetic stirrer. Triethylaluminum (1 ml.) was added through the serum stopper using a hypodermic syringe. Twenty minutes later another portion of triethylaluminum (1 ml.) was added. After an additional thirty minutes the reaction mixture was filtered in a nitrogen atmosphere. The infrared spectrum of the solid obtained as a filter cake included a strong sharp band at about 2145 cm.$^{-1}$, reflecting the presence of a $N_2$ ligand. The product was crude $[(C_6H_5)_3P]_3Ru(N_2)H_2$. A portion of the crude product was dissolved in tetrahydrofuran. Passing hydrogen through the solution for a few minutes resulted in loss of the infrared band at 2145 cm.$^{-1}$. Nitrogen was then bubbled through this solution. The infrared band at 2145 cm.$^{-1}$ reappeared. This demonstrates that the nitrogen ligand in the product is reversibly displaced by hydrogen.

A solution of the nitrogen complex in a toluene-hexane mixture darkened in air and deposited a black solid.

Example 2

A mixture of the toluene solvate of tris(triphenylphosphine)ruthenium chlorohydride (Example 1, Part A, 3.9 g.), ether (150 ml.), triethylaluminum (8 ml.) and nitrogen was reacted as described in Example 1, except that the reaction time was 2 hours and 10 minutes. A portion of the solid product (total yield=2.93 g.) was dissolved in benzene in a nitrogen atmosphere at ambient temperature. The slow addition of ethanol caused the separation of an off-white crystalline solid which was shown by analysis to be a benzene solvate of $[(C_6H_5)_3P]_3Ru(N_2)H_2$.

*Analysis.*—Calcd. for $[(C_6H_5)_3P]_3Ru(N_2)H_2 \cdot C_6H_6$ (percent): C, 72.30; H, 5.37; N, 2.81. Found (percent): C, 72.18, 72.13; H, 5.52, 5.45; N, 2.83, 3.17.

The infrared spectrum of this product in a Nujol mull included absorption bands at 2147, 1947, 1917 (shoulder), 1180, 1150, 1085, 1020, 995, 740 and 693 (s). In a sealed tube the complex darkened and appeared to decompose at 170–179° C.

Example 3

Part A.—A mixture of the toluene solvate of tris(triphenylphosphine)ruthenium chlorohydride (9.4 g.) in ether (300 ml.) and triethylaluminum (8 ml.) was stirred in a flask which was fitted with a solid carbon dioxide-acetone cooled condenser. The mixture was stirred and hydrogen was bubbled through it for four hours. It was filtered in an argon atmosphere to obtain 6.34 g. of a solid product which had an infrared absorption band at about 1900 cm.$^{-1}$ showing the presence of hydrogen bonded to ruthenium.

Part B.—Three grams of the product prepared in Part A and tetrahydrofuran (50 ml.) were stirred under nitrogen pressure (40 p.s.i) for two hours. Filtration of the reaction mixture gave 2.1 g. of solid which was a mixture of a starting material and the ruthenium-nitrogen complex. The addition of hexane (100 ml.) to the filtrate precipitated 0.2 g. of a solid, the ruthenium-nitrogen complex. This was removed by filtration. The addition of another 100 ml. of hexane to the new filtrate caused the slow separation of 0.2 g. of $[(C_6H_5)_3P]_3Ru(N_2)H_2$ which was dried in vacuum for two hours at ambient temperature.

*Analysis.*—Calcd. for $[(C_6H_5)_3P]_3Ru(N_2)H_2$ (percent): C, 70.70; H, 5.16; N, 3.05. Found (percent): C, 70.90, 70.93; H, 5.29, 5.38; N, 3.00, 2.96.

The infrared spectrum of this product in a Nujol mull included absorption bands identical to those reported for the product of Example 2. In deuterobenzene solution, a nuclear magnetic resonance signal for ruthenium-hydrogen was detected at +12.5 p.p.m. referenced to tetramethylsilane. The complex darkened above 140° C. M.P. 185° C.

Example 4

Part A.—A mixture of the toluene solvate of tris(triphenylphosphine)ruthenium chlorohydride (8.8 g.), triethylaluminum (8 ml.) and ether (340 ml.) was stirred in an argon atmosphere for four hours. The mixture was filtered in a nitrogen atmosphere and washed with ether. After drying in vacuum, the crude product weighed 6.07 g.

Part B.—A portion (5.56 g.) of the product from Part A was stirred in toluene (45 ml.) under nitrogen pressure (40 lb.) for 16 hours. The mixture was filtered in a nitrogen atomsphere. The filter cake was stirred in toluene in a nitrogen atmosphere (50 ml.) for 15 minutes and filtered. The addition of hexane (100 ml.) to this filtrate caused the slow separation of $[(C_6H_5)_3P]_3Ru(N_2)H_2$ (0.25 g.). The filter cake was stirred in another portion of toluene (50 ml.) in a nitrogen atmosphere for 15 minutes and refiltered. Part of this filtrate was mixed with three times its volume of hexane under nitrogen pressure (40 p.s.i.g.). A crystalline solid slowly separated and was shown to be $[(C_6H_5)_3P]_3Ru(N_2)H_2$ by infrared analysis. The remainder of the last filtrate was mixed with three times its volume of hexane in a normal nitrogen atmosphere; crystalline $[(C_6H_5)_3P]_3Ru(N_2)H_2$ separated slowly (0.15 g.). This was dried in vacuum at ambient temperature and analyzed.

*Analysis.*—Calcd. for $[(C_6H_5)_3P]_3Ru(N_2)H_2$ (percent): C, 70.70; H, 5.16; N, 3.05. Found (percent): C, 70.89, 71.05; H, 5.52, 5.33; N, 3.23, 3.57.

The product darkened at 151° C. and melted at 185° C. The infrared spectrum was identical with that of the nitrogen complex prepared in Example 2.

Example 5

Part A.—Nitrogen was bubbled through an ethanol slurry of sodium borohydride and the toluene solvate of tris(triphenylphosphine)ruthenium chlorohydride for 45 minutes. Filtration in a nitrogen atmosphere gave a red solid which had a weak infrared absorption band indicative of the presence of a nitrogen ligand. In a rerun the nitrogen flow was continued for 3 hours. The color of the product was lighter than that above and the infrared spectrum again suggested the presence of a nitrogen ligand.

Part B.—Nitrogen was passed through a mixture of ethanol (40 ml.), sodium borohydride (0.5 g.) and the toluene solvate of tris(triphenylphosphine)ruthenium chlorohydride for five hours; the mixture was then allowed to stand for 16 hours. Filtration gave a solid which was extracted with toluene (5 ml.). The extract was stirred for 20 minutes under nitrogen pressure (40 p.s.i.). Dilution with hexane precipitated 0.25 g. of $$[(C_6H_5)_3P]_3Ru(N_2)H_2$$

identified by comparison of its infrared spectra with that of the product of Example 2.

Example 6

Part A.—Preparation of $(p-CH_3C_6H_4)_4RuCl_2$: Commercial ruthenium trichloride (9.4 g.) was extracted with methanol (520 ml.). The extracts were mixed with tris-p-tolylphosphine (50 g.) and the mixture was refluxed overnight in a nitrogen atmosphere. Filtration gave 52 g. of $[(p-CH_3C_6H_4)_3P]_4RuCl_2$.

*Analysis.*—Calcd. for [(CH$_3$C$_6$H$_4$)$_3$P]$_4$RuCl$_2$ (percent): C, 72.6; H, 6.1; P, 8.9; Cl, 5.1. Found (percent): C, 73.6; H, 6.2; P, 9.3; Cl, 5.0.

Part B.—Preparation of [(p-CH$_3$C$_6$H$_4$)$_3$P]$_3$RuCl$_2$: Hydrogen chloride was passed through a mixture of

[(p-CH$_3$C$_6$H$_4$)$_3$P]$_4$RuCl$_2$ (6 g.) and toluene (75 ml.) for 5 minutes in a nitrogen atmosphere. Excess hydrogen chloride was then removed with a stream of nitrogen. The mixture was filtered under nitrogen, and hexane (400 ml.) was added to the filtrate which was then allowed to stand overnight. Dark crystals of [(p-CH$_3$C$_6$H$_4$)$_3$P]$_3$RuCl$_2$ formed together with a tan powder which was removed by rinsing with hexane.

*Analysis.*—Calcd. for [(p-CH$_3$C$_6$H$_4$)$_3$P]$_3$RuCl$_2$ (percent): C, 69.8; H, 5.8; Cl, 6.5; P, 8.6. Found (percent): C, 69.9; H, 6.0; Cl, 6.5; P, 8.6.

Part C.—Preparation of [(p-CH$_3$C$_6$H$_4$)$_3$P]$_3$Ru(N$_2$)H$_2$ and [(p-CH$_3$C$_6$H$_4$)$_3$P]$_3$RuH$_4$: Sodium borohydride (0.8 g.) was added to a mixture of [(p-CH$_3$C$_6$H$_4$)$_3$P]$_3$RuCl$_2$ (2.92 g.) and ethanol (80 ml.). The mixture was stirred for 1.5 hours in a nitrogen atmosphere then filtered. The filter cake was rinsed with ethanol to leave a yellow residue of [(p-CH$_3$C$_6$H$_4$)$_3$P]$_3$RuH$_4$ (2.5 g.). This was dissolved in benzene (15 ml.); the solution was swirled briefly in a nitrogen atmosphere and ethanol (100 ml.) was added. Crystalline [(p-CH$_3$C$_6$H$_4$)$_3$P]$_3$Ru(N$_2$)H$_2$ separated slowly.

*Analysis.*—Calcd. for [(CH$_3$C$_6$H$_4$)$_3$P]$_3$Ru(N$_2$)H$_2$ (percent): C, 72.5; H, 6.3; N, 2.7; P, 8.9. Found (percent): C, 74.5; H, 6.7; N, 2.2; P, 9.0.

Example 7

Part A.—Preparation of [(C$_6$H$_5$)$_3$P]$_3$RuCl$_2$: Hydrogen chloride was passed through a mixture of

[(C$_6$H$_5$)$_3$P]$_4$RuCl$_2$ (12 g., prepared as in lines 1–6, Example 1, Part A) and toluene (150 ml.) for 5 minutes. Excess hydrogen chloride was removed with a stream of nitrogen and the mixture was filtered. Hexane (400 ml.) was added to the filtrate. Filtration after the mixture stood for one day gave [(C$_6$H$_5$)$_3$P]$_3$RuCl$_2$ (4.7 g.).

*Analysis.*—Calcd. for [(C$_6$H$_5$)$_3$P]$_3$RuCl$_2$ (percent): C, 67.8; H, 4.7; P, 7.4. Found (percent): C, 67.4; H, 4.9; P, 7.7.

Part B.—Preparation of [(C$_6$H$_5$)$_3$P]$_3$RuN$_2$H$_2$: A mixture of sodium borohydride (0.5 g.), [(C$_6$H$_5$)$_3$P]$_3$RuCl$_2$ (2 g.) and ethanol (50 ml.) was stirred in a nitrogen atmosphere for three hours. The mixture was filtered; the filter cake was rinsed with alcohol, dried and extracted with benzene. The benzene extract was stirred in a nitrogen atmosphere briefly and then diluted with a fourfold excess of hexane. A crystalline precipitate of [(C$_6$H$_5$)$_3$P]$_3$Ru(N$_2$)H$_2$, identified by infrared analysis, separated slowly.

Example A

A solution of [(C$_6$H$_5$)$_3$P]$_3$Ru(N$_2$)H$_2$ (0.1 g.) in toluene (40 ml.) was prepared in an argon atmosphere (320 mm. total pressure). Air was admitted until the pressure was 420 mm. to give a gas phase containing about 4.8% oxygen. The mixture was stirred whereupon darkening was noticeable within 20 seconds, thus demonstrating the usefulness of the nitrogen complex as an air or oxygen detector.

Example B

Fourteen ml. of acrylonitrile and 200 mg.

[(C$_6$H$_5$)$_3$P]$_3$Ru(N$_2$)H$_2$ were stirred in 40 ml. hexamethylphosphoramide at 40 p.s.i.g. H$_2$ pressure for 1 hour 25 minutes at 125° C. Isolation of the liquid product by techniques known in the art gave a 54% yield of a mixture of cis and trans-1,4-dicyano-1-butene containing some adipic acid. The acrylonitrile conversion was 12%, thus demonstrating the catalytic properties of [(C$_6$H$_5$)$_3$P]$_3$Ru(N$_2$)H$_2$ in the production of 1,4-dicyanobutene-1 which can be converted to hexamethylenediamine, useful as a component of fiber forming polyamides with adipic acid.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

[(RC$_6$H$_4$)$_3$P]$_3$Ru(Q$_2$)H$_2$ in which R is hydrogen or an alkyl radical of 1 to 3 carbon atoms substituted in the meta or para position, and Q is N or H.

2. Compound of claim 1 wherein R is hydrogen.
3. Compound of claim 1 wherein R is p-methyl.
4.     [(C$_6$H$_5$)$_3$P]$_3$Ru(N$_2$)H$_2$
5.     [(C$_6$H$_5$)$_3$P]$_3$RuH$_4$
6. Method of making compounds having the formula [R(C$_5$H$_4$)$_3$P]$_3$Ru(N$_2$)H$_2$ wherein R is hydrogen or an alkyl radical of 1–3 carbon atoms substituted in the meta or para positions which comprises reacting a compound of the formula [(RC$_6$H$_4$)$_3$P[$_3$RuH$_4$ with nitrogen.
7. Method of making compounds having the formula [(RC$_6$H$_4$)$_3$P]$_3$Ru(N$_2$)H$_2$ wherein R is hydrogen or an alkyl radical of 1–3 carbon atoms substituted in the meta or para position which comprises reacting [(RC$_6$H$_4$)$_3$P]$_3$RuHX or [(RC$_6$H$_4$)$_3$RuX$_2$ when X is halogen having an atomic number from 17 to 53 with an alkali metal borohydride or a trialkylaluminum wherein the alkyl groups have from 1 to 10 carbon atoms and reacting the resultant product with nitrogen.
8. The method of claim 6 in which the reaction is conducted with an inert solvent.
9. The method of claim 7 in which the reaction is conducted in an inert solvent.

References Cited

Hallman et al.: Chem. Commun., 1967, pp. 305–6.

Dewhirst et al.: Inorg. Chem., vol. 7 (1968), pp. 546–551.

Brintzinger: J. Am. Chem. Soc., vol. 88 (1966), pp. 4307–8.

Yamamoto et al.: Chem. Commun., 1967, pp. 79–80.

TOBIAS E. LEVOW, Primary Examiner

ARTHUR P. DEMERS, Assistant Examiner

U.S. Cl. X.R.

23—232; 252—408, 431; 260—465.8

UNITED STATES PATENT OFFICE
CERTIFICATE OF CORRECTION

Patent No. 3,538,133          Dated November 3, 1970

Inventor(s) WALTER H. KNOTH, JR.

It is certified that error appears in the above-identified patent and that said Letters Patent are hereby corrected as shown below:

Column 6, line 34, that portion of the formula reading "$[R(C_5-$" should read -- $[R(C_6-$ --.

SIGNED AND SEALED

JUN 9 1971

(SEAL)
Attest:

Edward M. Fletcher, Jr.
Attesting Officer

WILLIAM E. SCHUYLER, JR.
Commissioner of Patents